US012665488B2

(12) United States Patent
Lee et al.

(10) Patent No.: US 12,665,488 B2
(45) Date of Patent: Jun. 23, 2026

(54) CHARGER INTEGRATED CIRCUIT INCLUDING SWITCHING CONVERTER AND ELECTRONIC DEVICE INCLUDING THE CHARGER INTEGRATED CIRCUIT

(71) Applicant: SAMSUNG ELECTRONICS CO., LTD., Suwon-si (KR)

(72) Inventors: Sungwoo Lee, Suwon-si (KR); Sungwoo Moon, Suwon-si (KR); Daewoong Cho, Suwon-si (KR); Jungwook Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 286 days.

(21) Appl. No.: 18/401,151

(22) Filed: Dec. 29, 2023

(65) Prior Publication Data

US 2024/0235368 A1 Jul. 11, 2024

(30) Foreign Application Priority Data

Jan. 5, 2023 (KR) ........................ 10-2023-0001945
May 4, 2023 (KR) ........................ 10-2023-0058496

(51) Int. Cl.
H02M 1/00 (2007.01)
H02J 7/06 (2006.01)
(Continued)

(52) U.S. Cl.
CPC ............. H02M 1/0845 (2013.01); H02J 7/06 (2013.01); H02M 1/0054 (2021.05);
(Continued)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 9,490,702 B1 * 11/2016 Zhak ..................... H02M 3/156
9,600,062 B2 3/2017 Kumar
(Continued)

FOREIGN PATENT DOCUMENTS

CN 108736709 A * 11/2018 ............ H02M 3/158
CN 120074228 A * 5/2025 .............. H02M 3/07
(Continued)

OTHER PUBLICATIONS

English Translation of CN 120074228 (Year: 2025).*
English Translation of CN 120320607 (Year: 2025).*

*Primary Examiner* — Crystal L Hammond
*Assistant Examiner* — Nusrat Quddus
(74) *Attorney, Agent, or Firm* — Morgan, Lewis & Bockius LLP

(57) ABSTRACT

A charger integrated circuit includes a switching converter and a controller. The switching converter includes a plurality of transistors including a first transistor, a second transistor, a fourth transistor, and a sixth transistor, which are serially connected to a first input/output node, a third transistor and a fifth transistor serially connected between the first connection node and the second connection node, a plurality of inductors including a first inductor connected to a node disposed between the second transistor and the fourth transistor and a load node and a second inductor connected between a node disposed between the third transistor and the fifth transistor and a second input/output node, and a capacitor connected between a first connection node and a second connection node.

20 Claims, 12 Drawing Sheets

(51) Int. Cl.

| | |
|---|---|
| *H02M 1/084* | (2006.01) |
| *H02M 3/158* | (2006.01) |
| *H02M 7/5395* | (2006.01) |

(52) U.S. Cl.
CPC ....... *H02M 1/0095* (2021.05); *H02M 3/1582* (2013.01); *H02M 7/5395* (2013.01); *H02J 2207/20* (2020.01)

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H05B 39/048; B23K 11/24; H04B 2215/069; H02J 3/46; H02J 3/38
See application file for complete search history.

(56) References Cited

U.S. PATENT DOCUMENTS

| | | | | |
|---|---|---|---|---|
| 10,181,794 | B1 * | 1/2019 | Chang ................... | H02M 3/285 |
| 10,199,939 | B1 * | 2/2019 | Chang ................... | H02M 3/156 |
| 11,101,735 | B2 | 8/2021 | Scoones et al. | |
| 11,522,466 | B1 * | 12/2022 | Li ....................... | H02M 7/4837 |
| 12,395,081 | B2 * | 8/2025 | Thota .................. | H02M 3/1586 |
| 2009/0224731 | A1 * | 9/2009 | Tang ................... | H02M 3/1584 323/241 |
| 2015/0077075 | A1 * | 3/2015 | Knoedgen ............ | H02M 1/088 323/272 |
| 2015/0214835 | A1 * | 7/2015 | Shao ..................... | H02M 3/158 323/234 |
| 2017/0248996 | A1 * | 8/2017 | Zhang ........................ | G06F 1/26 |
| 2017/0324326 | A1 * | 11/2017 | Liu ....................... | H02M 1/088 |
| 2018/0026526 | A1 * | 1/2018 | Ahmed .................. | H02M 3/07 323/271 |
| 2018/0054124 | A1 * | 2/2018 | Barth .................... | H02M 5/271 |
| 2019/0319593 | A1 * | 10/2019 | Delano .................. | H04R 3/00 |
| 2019/0348913 | A1 * | 11/2019 | Zhang ................... | H02M 3/07 |
| 2020/0099302 | A1 * | 3/2020 | Webb ................... | H02M 3/158 |
| 2020/0212795 | A1 * | 7/2020 | Das ........................ | H02M 3/07 |
| 2021/0111643 | A1 * | 4/2021 | Hsin .................... | H02M 7/487 |
| 2021/0288581 | A1 * | 9/2021 | Zhu ........................ | H02M 3/07 |
| 2021/0336529 | A1 * | 10/2021 | Zhou ...................... | H02H 3/087 |
| 2021/0359606 | A1 * | 11/2021 | Han ...................... | H02M 1/0054 |
| 2022/0071012 | A1 * | 3/2022 | Yoshioka ............ | H01F 27/2823 |
| 2022/0140651 | A1 | 5/2022 | Eftimie | |
| 2022/0149644 | A1 * | 5/2022 | Liu ....................... | H02J 7/0068 |
| 2022/0209660 | A1 * | 6/2022 | Sun ..................... | H02M 3/158 |
| 2022/0231518 | A1 | 7/2022 | Kun et al. | |
| 2023/0024198 | A1 * | 1/2023 | Kawano .................. | H02M 3/01 |
| 2023/0026736 | A1 * | 1/2023 | Liu ..................... | H02M 1/0095 |
| 2023/0048248 | A1 * | 2/2023 | Fletcher ............. | H02M 3/1584 |
| 2023/0179094 | A1 * | 6/2023 | Jin ...................... | H02M 1/0095 323/271 |
| 2023/0188028 | A1 * | 6/2023 | Wu ......................... | H02M 3/07 363/116 |
| 2023/0231473 | A1 * | 7/2023 | Cho ..................... | H02M 1/0043 713/340 |
| 2023/0318453 | A1 * | 10/2023 | Khan .................. | H02M 3/1584 323/283 |
| 2023/0412079 | A1 * | 12/2023 | Parto .................... | H02M 1/0009 |
| 2024/0204551 | A1 * | 6/2024 | Phadke .............. | H02J 7/00714 |
| 2024/0372478 | A1 * | 11/2024 | Jedari Zare Zadeh ..................... H02M 3/33584 | |
| 2025/0007399 | A1 * | 1/2025 | Chen .................... | H02M 3/071 |
| 2025/0030770 | A1 * | 1/2025 | Pelzer ................. | H04L 67/34 |
| 2025/0079872 | A1 * | 3/2025 | Kang ................. | H02J 7/00714 |
| 2025/0211116 | A1 * | 6/2025 | Lee ..................... | H03K 17/693 |
| 2025/0233439 | A1 * | 7/2025 | Ding .................... | H02J 7/0047 |
| 2025/0309830 | A1 * | 10/2025 | Gazder .............. | H02M 3/1584 |

FOREIGN PATENT DOCUMENTS

| | | | | |
|---|---|---|---|---|
| CN | 120320607 A | * | 7/2025 | ............. H02M 3/07 |
| KR | 10-2382987 | | 4/2022 | |
| KR | 10-2022-0081355 | | 6/2022 | |

\* cited by examiner

CHARGER INTEGRATED CIRCUIT INCLUDING SWITCHING CONVERTER AND ELECTRONIC DEVICE INCLUDING THE CHARGER INTEGRATED CIRCUIT

CROSS-REFERENCE TO RELATED APPLICATIONS

This application claims priority under 35 U.S.C. § 119 to Korean Patent Application No. 10-2023-0001945 filed on Jan. 5, 2023, and Korean Patent Application No. 10-2023-0058496 filed on May 4, 2023, the disclosures of which are incorporated by reference herein in their entireties.

TECHNICAL FIELD

Embodiments of the inventive concept relate to a switching converter, and more particularly, to a charger integrated circuit including a switching converter having multiple paths, and an electronic device including the charger integrated circuit.

DISCUSSION OF RELATED ART

Various types of electronic devices may be used for exchanging information or data. Rechargeable batteries may be used as power supply units of mobile electronic devices. Batteries have limited capacities, and thus, are depleted and recharged by the user. Travel adapters enabling charging of the batteries may be configured to convert power provided from AC 110 to 220 V as a domestic power source or other power supply units (e.g., a computer) into DC power for charging the batteries, and may provide the power to electronic devices. Thus, the electronic devices may use the DC power converted by chargers for charging the batteries.

Recently, as the power consumption of electronic devices increases, the capacities of batteries also have increased. Accordingly, batteries may be charged at various rates according to the magnitudes of voltages provided by chargers of a quick-charge type or a general charge type.

SUMMARY

Embodiments of the inventive concept provide a charger integrated circuit and an electronic device capable of reducing power loss due to a resistor component, and having a reduced size by separating power paths using a switching converter including one flying capacitor and two or more inductors.

According to an aspect of the inventive concept, there is provided a charger integrated circuit including a switching converter and a controller. The switching converter includes a plurality of transistors including a first transistor, a second transistor, a fourth transistor, and a sixth transistor, which are connected in series to a first input/output node, and a third transistor and a fifth transistor, which are connected in series between a first connection node and a second connection node. The first connection node is disposed between the first transistor and the second transistor, and the second connection node is disposed between the fourth transistor and the sixth transistor. The switching converter further includes a plurality of inductors including a first inductor connected between a third connection node and a load node, and a second inductor connected between the fourth connection node and a second input/output node. The third connection node is disposed between the second transistor and the fourth transistor, and the fourth connection node is disposed between the third transistor and the fifth transistor. A capacitor is connected between the first connection node and the second connection node, and the controller is configured to generate a plurality of pulse width modulation (PWM) signals based on a plurality of signals received from the switching converter, and generate, based on the plurality of PWM signals, a plurality of switching signals that control switching operations of the plurality of transistors.

According to an aspect of the inventive concept, there is provided a charger integrated circuit including a first transistor connected between a first node and a second node, a second transistor connected between the second node and a third node, a third transistor connected between the second node and the fourth node, a fourth transistor connected between the third node and a fifth node, a fifth transistor connected between the fourth node and the fifth node, a sixth transistor connected between the fifth node and a sixth node, a first inductor connected between the third node and a seventh node, a second inductor connected between the fourth node and an eighth node, and a capacitor connected between the second node and the fifth node. The charger integrated circuit is configured to generate a voltage of the eighth node as an output voltage by bucking a voltage of the first node.

According to an aspect of the inventive concept, there is provided an electronic device to/from which a battery may be attached/detached, the electronic device including a charger integrated circuit which includes a plurality of transistors including first to sixth transistors, a first inductor connected to a first node disposed between the second transistor and the fourth transistor, a second inductor connected to a second node disposed between the third transistor and the fifth transistor, and a capacitor connected to a third node and a fourth node. The third node is disposed between the first transistor and the second transistor, and the fourth node is disposed between the fourth transistor and the sixth transistor. The charger integrated circuit is configured to charge the battery by forming a first path including a first subpath that provides power from the third node to the battery through the first inductor, and a second subpath that provides power from the third node to the battery through the second inductor.

BRIEF DESCRIPTION OF THE DRAWINGS

The above and other features of the inventive concept will become more apparent by describing detail embodiments thereof with reference to the accompanying drawings, in which:

FIG. 6 is a diagram schematically illustrating a modulator according to an embodiment of the inventive concept;

DETAILED DESCRIPTION OF THE EMBODIMENTS

Figure 1:
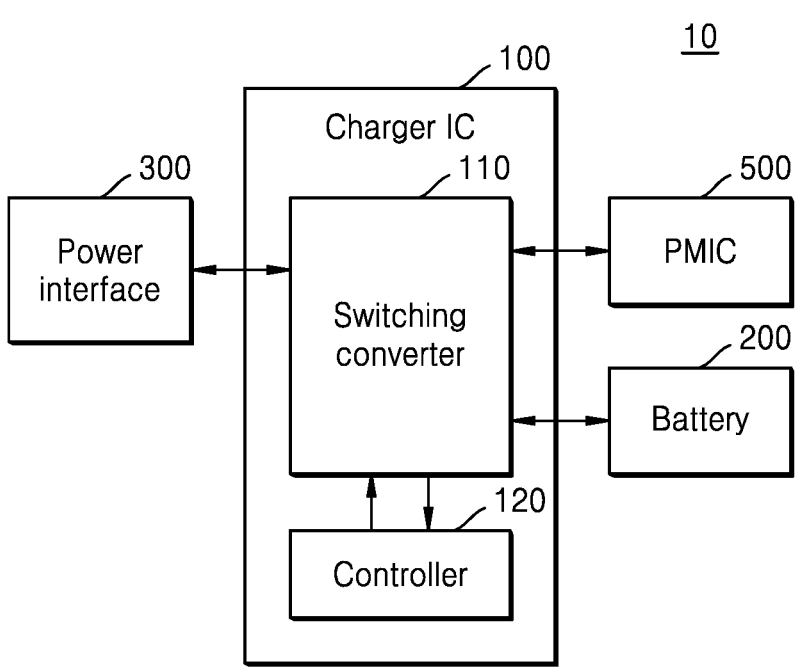
FIG. 1 is a block diagram schematically illustrating an electronic device including a charger integrated circuit according to an embodiment of the inventive concept.

Embodiments of the inventive concept will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

FIG. 1 is a block diagram schematically illustrating an electronic device including a charger integrated circuit according to an embodiment of the inventive concept.

Referring to FIG. 1, an electronic device 10 may include a charger integrated circuit (IC) 100, a battery 200, a power interface 300, and a power management integrated circuit (PMIC) 500. In addition, the electronic device 10 may further include a main processor and peripheral devices. For example, the electronic device 10 may include mobile devices such as smartphones, tablet personal computers (PC), mobile phones, personal digital assistants (PDA), laptop computers, wearable devices, global positioning system (GPS) systems, electronic-book readers, digital broadcasting terminals, MP3 players, and digital cameras. For example, the electronic device 10 may also include electric vehicles.

The battery 200 may be embedded in the electronic device 10. In an embodiment, the battery 200 may be attached to/detached from the electronic device 10. The battery 200 may include a battery cell or a plurality of battery cells. The plurality of battery cells may be connected in series or in parallel to one another. When an external charging device is not connected to the electronic device 10, the battery 200 may be configured to supply power to the electronic device 10.

The charger integrated circuit 100 may be configured to charge the battery 200, and may be referred to as a "battery charger". In addition, the charger integrated circuit 100 may be configured to supply power to an external device connected to the charger integrated circuit 100 through the power interface 300, based on a voltage charged in the battery 200. For example, the charger integrated circuit 100 may be implemented as one or more integrated circuit chips and mounted on a printed circuit board (PCB).

The charger integrated circuit 100 may include a switching converter 110 and a controller 120. The switching converter 110 may be implemented as a three-level DC-DC converter including a plurality of transistors (e.g., a first transistor P1, a second transistor P2A, a third transistor P2B, a fourth transistor N2A, a fifth transistor N2B, and a sixth transistor N1 shown in FIG. 2), a plurality of inductors (e.g., a first inductor $L_A$ and a second inductor $L_B$ shown in FIG. 2), and a flying capacitor (e.g., a capacitor CF shown in FIG. 2). Here, three-level indicates the number of voltage levels used for a switching operation. The three-level DC-DC converter may be configured to generate an output voltage by switching an input voltage, a $(\frac{1}{2})$*input voltage, and a ground voltage (e.g., 0 V). The switching converter 110 may be configured to perform a buck converting operation to buck an input voltage to generate an output voltage, and a boost converting operation or a load boosting operation to boost the input voltage to generate the output voltage.

In some embodiments, when the switching converter 110 bucks the input voltage, e.g., in the buck-converting operation, a first path (or a first power path, hereinafter referred to as the first path) may be formed. The first path is a path that provides power from at least one external device connected to the electronic device 10 through the power interface 300 to the battery 200 through a plurality of inductors (e.g., the plurality of inductors $L_A$ and $L_B$ shown in FIG. 2). The first path may include a first subpath that provides power to the battery 200 through one of the plurality of inductors (e.g., the inductor $L_A$ shown in FIG. 2) and a second subpath that provides power to the battery 200 through another one of the plurality of inductors (e.g., the inductor $L_B$ shown in FIG. 2), and as the switching converter 110 is configured to charge the battery 200 through the first subpath and the second subpath, a charging rate of the battery 200 may increase.

In some embodiments, when the charger transistor (e.g., the charger transistor Qbat shown in FIG. 4) is connected between the plurality of inductors, in the first path that provides the power to the battery 200, the first subpath passes via the charger transistor while the second subpath does not pass via the charger transistor. Accordingly, power loss due to a resistor component of the charger transistor may be reduced compared with a case in which the battery is charged using one inductor.

In some embodiments, when the switching converter 110 boosts the input voltage, e.g., in the boost-converting operation, a charger path that provides the power from the battery 200 to at least one external device may be formed.

The PMIC 500 may indicate a circuit configured to perform electronic power conversion or a power control function. In some embodiments, the PMIC 500 may be connected to the switching converter 110 (e.g., connected to a node between the first inverter $L_A$ and the charger transistor Qbat shown in FIG. 4) and configured to receive power from the switching converter 110. The PMIC 500 may be configured to convert, rectify, distribute, and control a voltage or a current utilized by the electronic device 10. For example, the switching converter 110 may be configured to charge the battery 200 through the power interface 300, and the switching converter 110 may also be configured to supply power to the PMIC 500 through the battery 200 that has been charged. The PMIC 500 may be configured to convert, rectify, distribute, and control a voltage or a current utilized by the electronic device 10, based on the power that has been received.

Figure 4:
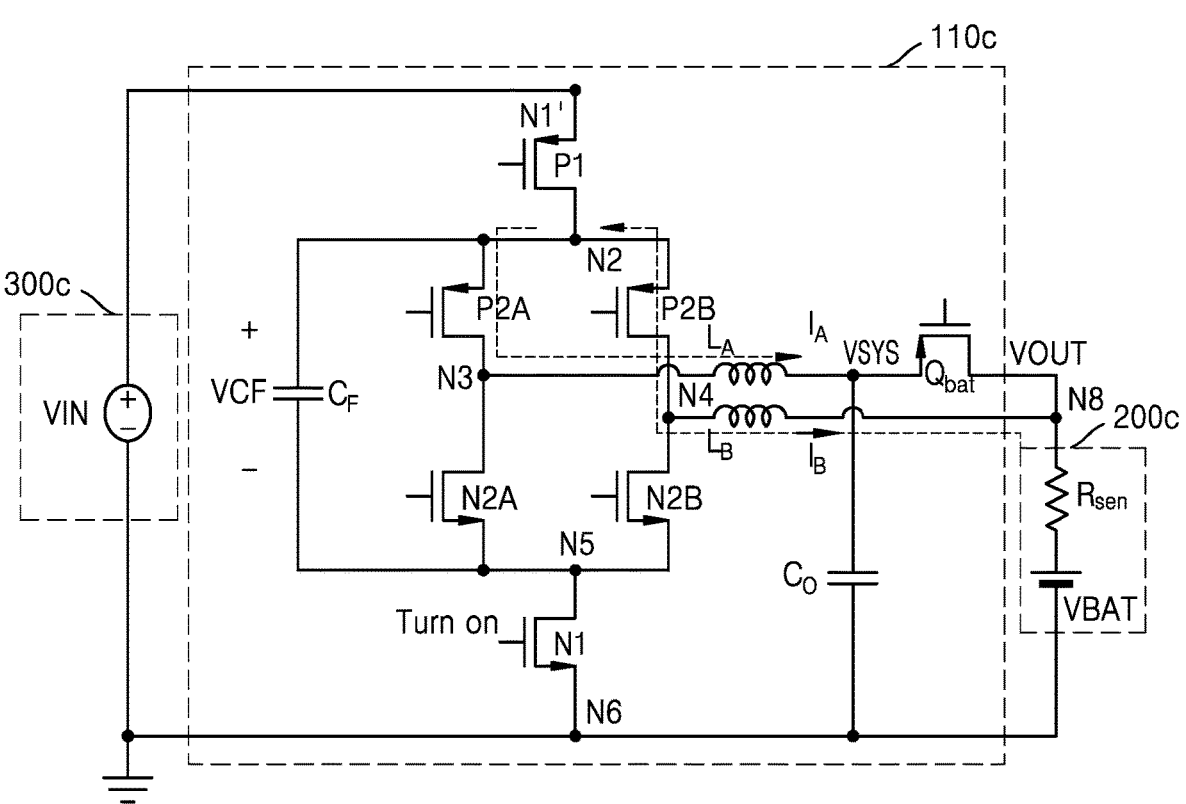
FIG. 4 illustrates a second path and a third path in a load boosting operation performed by a switching converter according to an embodiment of the inventive concept.

In some embodiments, when a residual charged capacity of the battery 200 is lower than a certain level, e.g., in the load-boosting operation, a second path that provides the power from the battery 200 to a first connection node (e.g., a node between the first transistor P1 and the third transistor P2B shown in FIG. 4) and a third path that provides the power from the first connection node to a load node (e.g., a node between the first inductor $L_A$ and the charger transistor Qbat shown in FIG. 4) may be formed. For example, in an embodiment, when a voltage of the battery 200 is less than a threshold voltage in a state in which an external device is not connected to the electronic device 10 through the power interface 300, the switching converter 110 does not provide power to the PMIC 500 through the battery 200, and the electronic device 10 may be powered off. To address this situation, when the voltage of the battery 200 is less than the threshold voltage, the switching converter 110 may boost a voltage of the first connection node through the second path, and may buck a voltage of the load node through the third path that provides the power from the first connection node to the load node. Accordingly, in an embodiment, even when a residual charged capacity of the battery 200 is lower than a certain level, the electronic device 10 is not powered off, and the switching converter 110 may stably provide power to the PMIC 500.

The switching converter 110 may be configured to operate in a buck mode, a boost mode, a buck-boost mode, or a load boosting mode. In the buck mode, the switching converter 110 may be configured to perform the buck-converting operation to buck an input voltage and charge the battery 200 based on the voltage that has been bucked. In the boost mode, the switching converter 110 may be configured to perform the boost converting operation to boost the voltage input from the battery 200 and provide power to the external device based on the voltage that has been boosted. In the buck-boost mode, the switching converter 110 may be configured to perform the buck-converting operation or boost-converting operation according to an amount of power provided from the external device connected to the charger integrated circuit 100 or an amount of power provided to the external device. In the load boosting mode, the switching converter 110 may be configured to boost the voltage input from the battery 200, buck the voltage of the first connection node that has been boosted, and provide power to the PMIC 500 through the load node based on the voltage that has been bucked.

The controller 120 may be configured to control mode changes among a plurality of switching modes of the switching converter 110, e.g., the buck mode, the boost mode, the buck-boost mode, and the load boosting mode. In addition, the controller 120 may be configured to control switching operations of the switching converter 110 according to the switching modes. In some embodiments, the controller 120 may be configured to generate switching signals that control switching operations of the switching converter 110 under the switching modes. For example, the controller 120 may be configured to generate a plurality of pulse width modulation (PWM) signals based on a plurality of signals received from the switching converter 110, and generate the plurality of switching signals capable of controlling switching operations of the plurality of transistors, based on the plurality of PWM signals.

Figure 5:
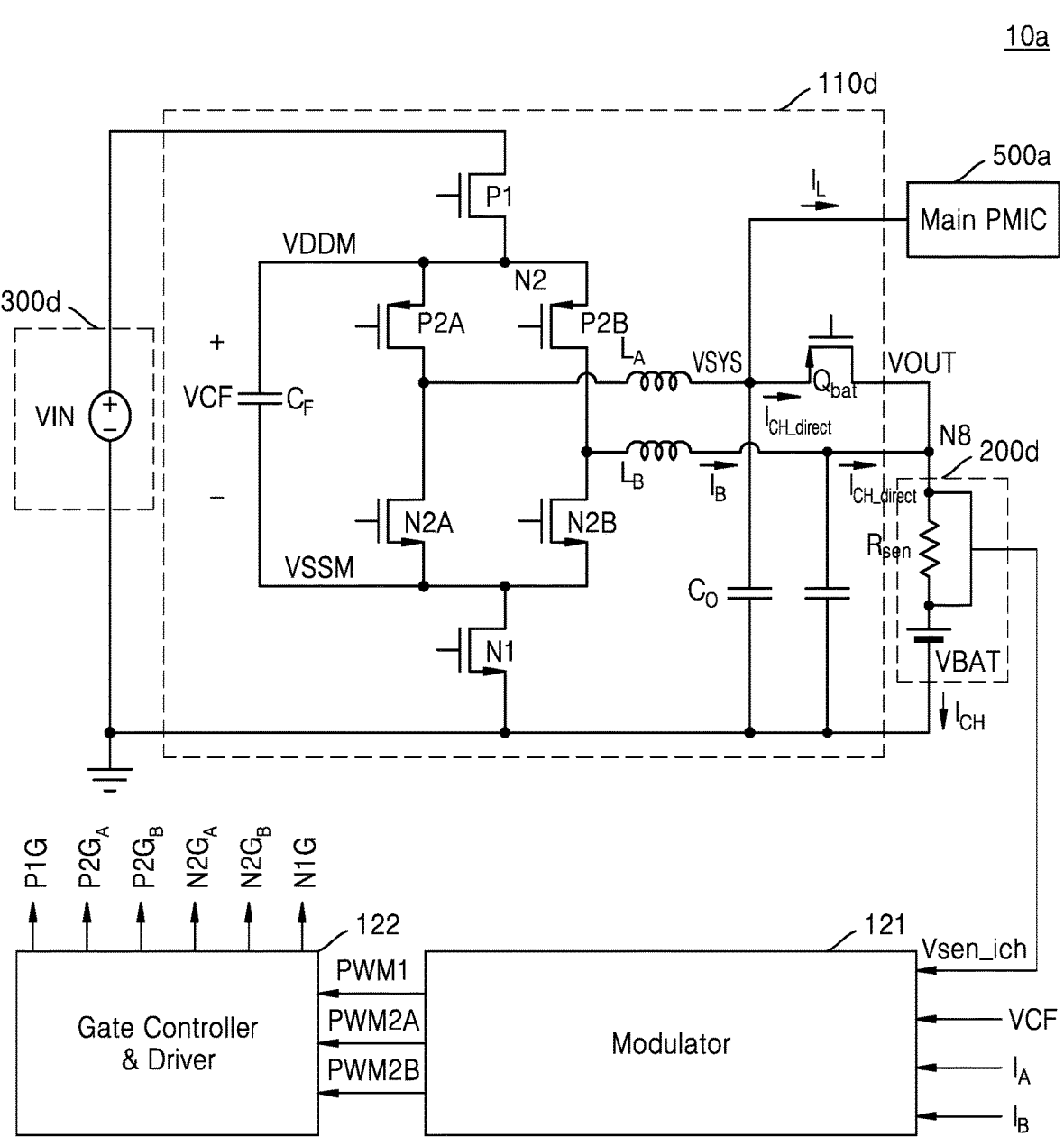
FIG. 5 is a block diagram schematically illustrating an electronic device including a modulator according to an embodiment of the inventive concept.

In some embodiments, the plurality of signals received from the switching converter 110 may include a voltage (e.g., the voltage Vsen_ich shown in FIG. 5), a voltage (e.g., the voltage VCF shown in FIG. 5) of the flying capacitor, and the current (e.g., the currents $I_A$ and $I_B$ shown in FIG. 5) flowing through the plurality of inductors, and based thereon, the controller 120 may generate a first PWM signal (e.g., the first PWM signal PWM1) shown in FIG. 5, a second PWM signal (e.g., the second PWM signal PWM2A) shown in FIG. 5, and a third PWM signal (e.g., the third PWM signal PWM2B) shown in FIG. 5. For example, the controller 120 may be configured to generate the switching signals based on the first PWM signal PWM1, the second PWM signal PWM2A, and the third PWM signal PWM2B for the switching converter 110 to perform the buck converting operation, the boost converting operation, or the load boosting operation. Some embodiments thereof will be described below with reference to FIG. 5.

In some embodiments, the controller 120 may be configured to control the currents (e.g., the currents $I_A$ and $I_B$ shown in FIG. 5) flowing through the plurality of inductors, based on the first PWM signal PWM1 and the second PWM signal PWM2A. Some embodiments thereof will be described below with reference to FIG. 7.

In some embodiments, the charger integrated circuit 100 may be configured to support at least one of various functions such as, for example, a under-voltage lockout (UVLO) function, an over-current protection (OCP) function, an over-voltage protection (OVP) protection, a soft-start function that reduces an inrush current, a foldback current limit function, a hiccup mode function that protects of a short-circuit, an over-temperature protection (OTP) function, and the like.

In some embodiments, the electronic device 10 may support wired charging and wireless charging, and may include the power interface 300 including a wired power interface for wired charging and a wireless power interface for wireless charging. For example, the wired power interface may include a wired charging circuit (e.g., a wired charging circuit QI1 shown in FIG. 9), and the wireless power interface may include a wireless charging circuit (e.g., a wireless charging circuit QI2 shown in FIG. 9). The wired charging circuit and the wireless charging circuit may each include, for example, a rectifier, a regulator, and the like. Some embodiments thereof will be described below with reference to FIG. 9.

Figure 2:
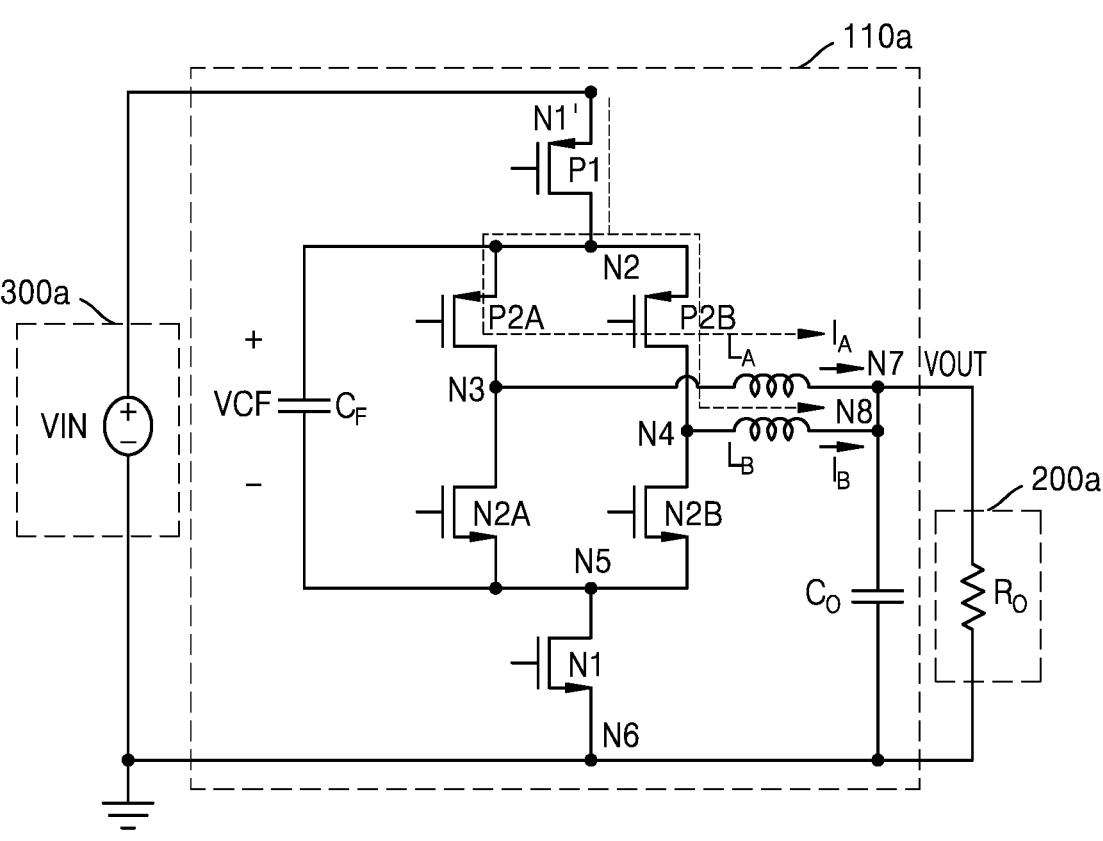
FIG. 2 is a circuit diagram illustrating a switching converter according to an embodiment of the inventive concept.

FIG. 2 is a circuit diagram illustrating a switching converter 110a according to an embodiment of the inventive concept.

In some embodiments, the switching converter 110a shown in FIG. 2 may include the switching converter 110 shown in FIG. 1, a battery 200a may include the battery 200 shown in FIG. 1, and a power interface 300a may include the power interface 300 shown in FIG. 1. For convenience of explanation, a further description of components and technical aspects previously described may be omitted.

Referring to FIG. 2, the switching converter 110a may include a plurality of transistors P1, P2A, P2B, N2A, N2B, and N1, a plurality of inductors $L_A$ and $L_B$, and a capacitor CF.

The plurality of transistors may include a first transistor P1, a second transistor P2A, a third transistor P2B, a fourth transistor N2A, a fifth transistor N2B, and a sixth transistor N1. In some embodiments, the first transistor P1 may be connected between a first node (or a first input-output node) N1' and a second node (or a first connection node) N2, the second transistor P2A may be connected between the second node N2 and a third node N3, the third transistor P2B may be connected between the second node N2 and a fourth node N4, the fourth transistor N2A may be connected between the third node N3 and a fifth node (or a second connection node) N5, the fifth transistor N2B may be connected between the fourth node N4 and the fifth node N5, and the sixth transistor N1 may be connected between the fifth node N5 and a sixth node N6. In some embodiments, each of the plurality of transistors may include an N-channel Metal Oxide Semiconductor (NMOS) or a P-channel Metal Oxide Semiconductor (PMOS). In some embodiments, a seventh node N7 and an eighth node N8 may include a same node.

The plurality of inductors may include a first inductor $L_A$ and a second inductor $L_B$. In some embodiments, the first inductor $L_A$ may be connected between the third node N3 and the seventh node N7, and the second inductor $L_B$ may be connected between the fourth node N4 and the eighth node N8 (e.g., a second input/output node) N8.

In some embodiments, the capacitor CF (or the flying capacitor) may be connected between the second node N2 and the fifth node N5, and as transistors of a current path passing through the first inductor $L_A$ and transistors of a path passing through the second inductor $L_B$ share one capacitor CF, a size of the electronic device 10 shown in FIG. 1 may be reduced.

In some embodiments, when the switching converter 110a performs a first operation, e.g., in the buck-converting operation, the first path that provides the power from at least one external device connected to the charger integrated circuit through a power interface 300a to the battery 200a through the plurality of inductors (e.g., $L_A$ and $L_B$) may be formed. The first path may include the first subpath that provides the power to the battery 200a through the first inductor $L_A$ and the second subpath that provides the power to the battery 200a through the second inductor $L_B$.

For example, the switching converter 110a may be configured to receive a first switching signal from the controller 120 shown in FIG. 1. Based on the first switching signal, the first transistor P1 and the sixth transistor N1 may perform a constructive switching operation, the second transistor P2A and the fourth transistor N2A may perform a constructive switching operation, and the third transistor P2B and the fifth transistor N2B may perform a constructive switching operation. In a certain period, the first transistor P1 may be turned on and the sixth transistor N1 may be turned off. In a portion of a certain period, the second transistor P2A and the third transistor P2B may be turned on, and the fourth transistor N2A and the fifth transistor N2B may be turned off. In another portion of the certain period, the fourth transistor N2A and the fifth transistor N2B may be turned on, and the second transistor P2A and the third transistor P2B may be turned off. The first subpath may be formed as a result of the switching operation of the second transistor P2A and the fourth transistor N2A, and the second subpath may be formed as a result of the switching operation of the third transistor P2B and the fifth transistor N2B. As the switching converter 110a is configured to charge the battery 200a through the first subpath and the second subpath, a rate of charging the battery 200a may be increased.

However, the inventive concept is not limited thereto. For example, according to embodiments, the switching converter 110a may include six or more transistors, two or more inductors, and one flying capacitor. For example, the switching converter 110a may include one flying capacitor, three inductors, and eight transistors. Two inductors may be connected to the seventh node N7, and one inductor may be connected to the eighth node N8. In some embodiments, one inductor may be connected to the seventh node N7, and two inductors may be connected to the eighth node N8.

In some embodiments, an average value of a first current flowing through the first inductor $L_A$ may be identical to an average value of a second current flowing through the second inductor $L_B$. For example, the switching converter 110a may be configured to receive a switching signal from the controller 120, and based on the switching signal, when charging of a 25 W level is desired, the switching converter 110a may be configured to perform the charging of the 25 W level by controlling the average values of the first current and the second current to be identical to each other. However, the inventive concept is not limited thereto. The switching converter 110a may be configured to perform charging at a 25 W level. For example, when charging of the 25 W level is desired, the switching converter 110a may charge 15 W through the first inductor $L_A$ by controlling the average values of the first current and the second current to be different from each other, and then may charge 10 W through the second inductor $L_B$.

A capacitor Co may be connected to the seventh node N7, and the battery 200a may include a resistor Ro. In some embodiments, during performance of the boost-converting operation by the switching converter 110a, an input voltage applied to the seventh node N7 may be stabilized, and during performance of the buck-converting operation, an output voltage VOUT having a square wave and output to the seventh node N7 may be rectified into a direct voltage.

Figure 3:
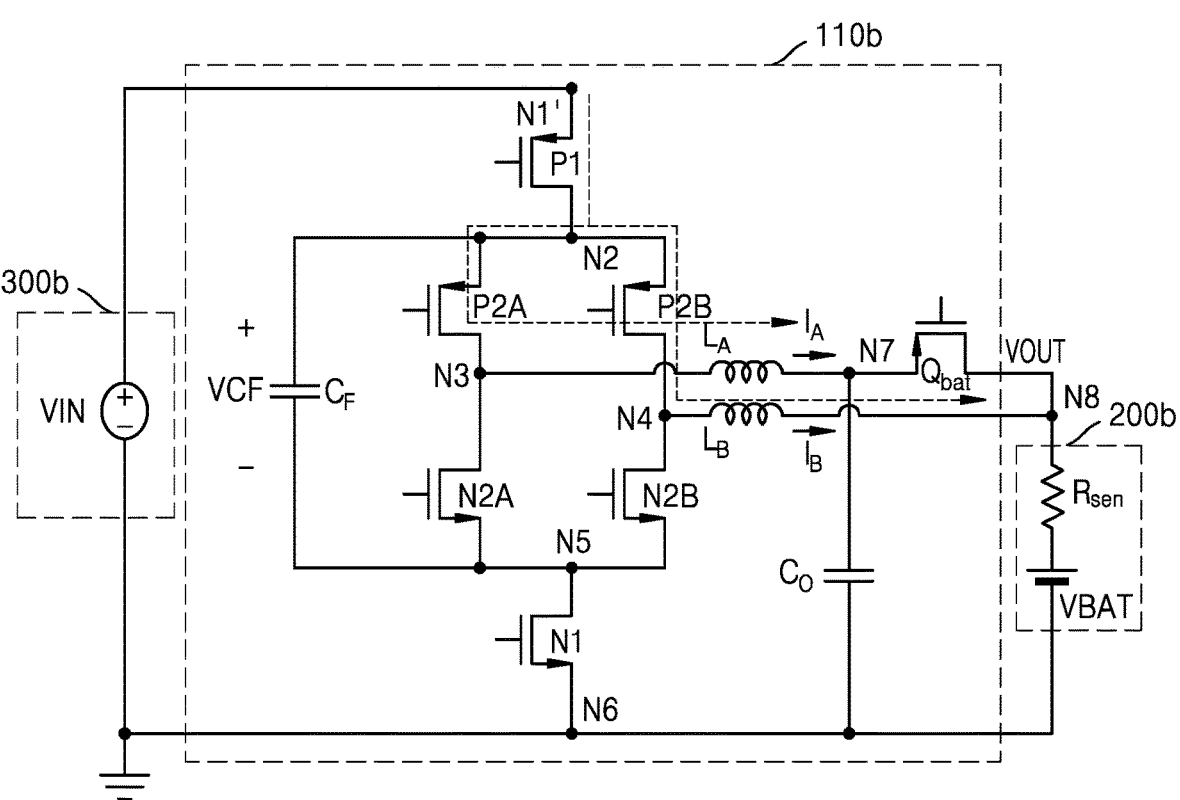
FIG. 3 illustrates a circuit diagram of a switching converter according to an embodiment of the inventive concept and a first path during a buck converting operation.

FIG. 3 illustrates a circuit diagram of a switching converter 110b according to an embodiment of the inventive concept and the first path during the buck-converting operation.

In some embodiments, the switching converter 110b may include the switching converter 110 shown in FIG. 1 or the switching converter 110a shown in FIG. 2, a battery 200b may include the battery 200 shown in FIG. 1, and a power interface 300b may include the power interface 300 shown in FIG. 1. For convenience of explanation, a further description of components and technical aspects previously described may be omitted.

Referring to FIG. 3, the switching converter 110b may include the plurality of transistors (e.g., the first transistor P1, the second transistor P2A, the third transistor P2B, the fourth transistor N2A, the fifth transistor N2B, the sixth transistor N1, and the seventh transistor (the charger transistor) Qbat), the plurality of inductors (e.g., the first inductor $L_A$ and the second inductor $L_B$), and the capacitor CF.

In some embodiments, the charger transistor Qbat (or the seventh transistor) may be turned off when an overcurrent occurs. For example, the PMIC 500 shown in FIG. 1 may be connected to the switching converter 110b, and when a current flowing from the switching converter 110b through the PMIC 500 shown in FIG. 1 is about equal to or greater than a threshold current, e.g., when the overcurrent occurs, the charging transistor Qbat may be turned off.

In some embodiments, when the switching converter 110b performs the first operation, e.g., the buck-converting operation, the first path that provides the power from at least one external device connected to the electronic device 10 shown in FIG. 1 through a power interface 300b to the battery 200b, which may include a resistor Rsen, through the plurality of inductors $L_A$ and $L_B$ may be formed. The first path may include the first subpath that provides the power to the battery 200b through the first inductor $L_A$ and the second subpath that provides the power to the battery 200b through the second inductor $L_B$.

For example, the switching converter 110b may be configured to receive the first switching signal from the controller 120 shown in FIG. 1. Based on the first switching operation, the first transistor P1 and the sixth transistor N1 may perform a constructive switching operation, and the second transistor P2A and the fourth transistor N2A may perform a constructive switching operation. Based on the first switching signal, the third transistor P2B and the fifth transistor N2B may perform a constructive switching operation, and the charger transistor Qbat may perform a switching operation. In a certain period, the first transistor P1 and the charger transistor Qbat may be turned on and the sixth transistor N1 may be turned off. In a portion of a certain period, the second transistor P2A and the third transistor P2B may be turned on, and the fourth transistor N2A and the fifth transistor N2B may be turned off. In another portion of the certain period, the fourth transistor N2A and the fifth transistor N2B may be turned on, and the second transistor P2A and the third transistor P2B may be turned off. The first subpath may be formed as a result of the switching operation of the second transistor P2A and the fourth transistor N2A, and the second subpath may be formed as a result of the switching operation of the third transistor P2B and the fifth transistor N2B. As the switching converter 110b is configured to charge the battery 200b through the first subpath and the second subpath, a rate of charging the battery 200b may be increased.

In some embodiments, when the charger transistor Qbat is connected between the seventh node N7 and the eighth node N8, a first subpath of the first path that provides power to the battery 200b passes via the charger transistor Qbat, while the second subpath does not pass via the charger transistor Qbat. When the battery is charged using one inductor, the current passes through one path passing through the charger transistor Qbat, and therefore, the current flowing through the charger transistor Qbat when the battery is charged using two inductor may be less than when the battery is charged using one inductor. Accordingly, power loss due to the resistance component of the charger transistor may be reduced compared with when the battery is charged using one inductor.

FIG. 4 illustrates the second path and a third path in a load boosting operation of a switching converter 110c according to an embodiment of the inventive concept.

In some embodiments, the switching converter 110c may include the switching converter 110b shown in FIG. 2, and a battery 200c may include the battery 200 shown in FIG. 1. A power interface 300c may include the power interface 300 shown in FIG. 1. For convenience of explanation, a further description of components and technical aspects previously described may be omitted.

Referring to FIG. 4, the switching converter 110c may include the plurality of transistors (e.g., the first transistor P1, the second transistor P2A, the third transistor P2B, the fourth transistor N2A, the fifth transistor N2B, the sixth transistor N1, and the seventh transistor Qbat), the plurality of inductors (e.g., the first inductor $L_A$ and the second inductor $L_B$), and the capacitor (the flying capacitor CF).

In some embodiments, the PMIC 500 shown in FIG. 1 may be connected to the load node (e.g., the node between the first inductor $L_A$ and the seventh transistor Qbat), and may receive power from the switching converter 110c through the load node. In an embodiment, when a residual charged capacity of the battery 200c is lower than a certain level in a state where the external device is not connected to the electronic device 10 shown in FIG. 1 through the power interface 300c (e.g., when a voltage of the battery 200c is lower than the threshold voltage), the switching converter 100c does not provide power to the PMIC 500 shown in FIG. 1 through the battery 200c, and the electronic device 10 shown in FIG. 1 may be turned off. To address this, when the voltage of the battery 200c is lower than the threshold voltage, the switching converter 100c may be configured to perform the second operation (e.g., the load boosting operation).

In some embodiments, when the switching converter 110c performs the second operation, e.g., in the load boosting operation, the second path and the third path may be formed. The second path is configured to boost the voltage input from the battery 200c, and the third path is configured to buck the boosted voltage of the first connection node and provide power to the electronic device based on the voltage that has been bucked. The second path may include a path that boosts the voltage of the first connection node from the battery 200c through the second inductor $L_B$, and the third path may include a path that provides the power from the first connection node to the electronic device through the first inductor $L_A$.

For example, the switching converter 110c may be configured to receive a second switching signal from the controller 120 shown in FIG. 1, and based on the second switching signal, the switching converter 110c may be configured to perform a second operation including a third operation, a fourth operation, and a fifth operation. The third operation may indicate a switching operation in which the first transistor P1 and the seventh transistor Qbat may be turned off and the sixth transistor N1 may be turned on. The fourth operation may indicate a boost switching operation in which the third transistor P2B and the fifth transistor N2B may constructively perform a switching operation. The boost switching operation may indicate a switching operation in which the third transistor P2B may be turned on and the fifth transistor N2B may be turned off during a period after a certain period. The fifth operation may indicate a buck switching operation in which the second transistor P2A and the fourth transistor N2A may constructively perform a switching operation. The buck switching operation may indicate a switching operation in which the second transistor P2A may be turned on and the fourth transistor N2A may be turned off during a period after a certain period. The second path may be formed as a result of the fourth operation, and the third path may be formed as a result of the fifth operation. Accordingly, when the residual charged capacity of the battery 200c is less than a certain level, the switching converter 110c may be configured to maintain a voltage Vsys of the load node at a certain level, and the electronic device may stably receive power without being turned off.

FIG. 5 is a block diagram schematically illustrating an electronic device 10a including a modulator according to an embodiment of the inventive concept.

In some embodiments, the electronic device 10a may include a switching converter 110d, a modulator 121, a gate controller and driver 122, a power interface 300d, and a main PMIC 500a. The switching converter 110d may include the switching converter 110 shown in FIG. 1 or the switching converter 110a shown in FIG. 2, and a battery 200d may include the battery 200 shown in FIG. 1. The power interface 300d may include the power interface 300 shown in FIG. 1, and the main PMIC 500a may include the PMIC 500 shown in FIG. 1. For convenience of explanation, a further description of components and technical aspects previously described may be omitted Referring to FIG. 5, the modulator 121 may be configured to receive a plurality of signals from the switching converter 110d and generate a plurality of PWM signals based on the plurality of signals. In some embodiments, the modulator 121 may be configured to receive the plurality of voltages Vsen_ich and VCF and the plurality of currents $I_A$ and $I_B$, and generate the plurality of PWM signals (e.g., the first PWM signal PWM1, the second PWM signal PWM2A, and the third PWM signal PWM2B) based thereon. Some embodiments thereof will be described below with reference to FIGS. 6 to 8B.

The gate controller and driver 122 may be configured to receive the plurality of PWM signals from the modulator 121 and generate the plurality of switching signals that control the switching operations of the plurality of transistors (e.g., the first transistor P1, the second transistor P2A, the third transistor P2B, the fourth transistor N2A, the fifth transistor N2B, the sixth transistor N1, and the seventh transistor Qbat), based on the plurality of PWM signals. In some embodiments, the gate controller and driver 122 may be configured to receive the plurality of PWM signals (e.g., the first PWM signal PWM1, the second PWM signal PWM2A, and the third PWM signal PWM2B) from the modulator 121 and generate a first switching signal, a second switching signal, a third switching signal, and a fourth switching signal, based on the plurality of PWM signals (the first PWM signal PWM1, the second PWM signal PWM2A, and the third PWM signal PWM2B). In some embodiments, the first switching signal to the fourth switching signal may include a switching voltage PIG input to a gate of the first transistor P1, a switching voltage $P2G_A$ input to a gate of the second transistor P2A, a switching voltage $P2G_B$ input to a gate of the third transistor P2B, a switching voltage $N2G_A$ input to a gate of the fourth transistor N2A, a switching voltage $N2G_B$ input to a gate of the fifth transistor N2B, a switching voltage N1G input to a gate of the sixth transistor N1, and a switching voltage (referred to as QbatG) input to a gate of the seventh transistor Qbat. For example, according to an active level of an inactive level of each of the first PWM signal PWM1, the second PWM signal PWM2A, and the third PWM signal PWM2B, the gate controller and driver 122 may generate each of the plurality of switching voltages to be logic high or logic low.

When a switching voltage is logic high (e.g., a voltage higher than 0 V), a transistor to which the switching voltage is applied may be turned on, and when the switching voltage is logic low (e.g., 0 V), a transistor to which the switching voltage is applied may be turned off.

In some embodiments, the gate controller and driver 122 may be configured to generate the first switching signal, and the switching converter 110d may be configured to perform the buck converting operation based on the first switching signal. For example, based on the first switching signal, in a certain period, the switching voltage PIG and the switching voltage QbatG may be logic high, and the switching voltage N1G may be logic low. Accordingly, the first transistor P1 and the seventh transistor Qbat may be turned on, and the sixth transistor N1 may be turned off. Based on the first switching signal, in a period of a certain period, the switching voltage $P2G_A$ and the switching voltage $P2G_B$ may be logic high, and the switching voltage $N2G_A$ and the switching voltage $N2G_B$ may be logic low. Accordingly, the second transistor P2A and the third transistor P2B may be turned on, and the fourth transistor N2A and the fifth transistor N2B may be turned off. In another portion of the certain period, the switching voltage $P2G_A$ and the switching voltage $P2G_B$ may be logic low, and the switching voltage $N2G_A$ and the switching voltage $N2G_B$ may be logic high. Accordingly, the fourth transistor N2A and the fifth transistor N2B may be turned on, and the second transistor P2A and the third transistor P2B may be turned off. The first subpath may be formed as a result of the switching operation of the second transistor P2A and the fourth transistor N2A, and the second subpath may be formed as a result of the switching operation of the third transistor P2B and the fifth transistor N2B.

In some embodiments, the main PMIC 500a may be connected to a node between the first inductor $L_A$ and the seventh transistor Qbat, e.g., the load node, and the load current IL may flow through the main PMIC 500a. The main PMIC 500a may receive power from the switching converter 110d through the load node. In an embodiment, when a residual charged capacity of the battery 200d is lower than a certain level in a state where the external device is not connected to the electronic device 10 shown in FIG. 1 (e.g., when a voltage of the battery 200d is lower than the threshold voltage), the switching converter 100d does not provide power to the main PMIC 500a through the battery 200d, and the electronic device 10a may be turned off. To address this, when the voltage of the battery 200d is lower than the threshold voltage, the gate controller and driver 122 may be configured to generate the second switching signal, and the switching converter 110d may be configured to perform a load boosting operation based on the second switching signal.

For example, based on the second switching signal, during a certain period, the switching voltage PIG and the switching voltage QbatG may be logic low, and the switching voltage N1G may be logic high. Accordingly, the first transistor P1 and the seventh transistor Qbat may be turned off, and the sixth transistor N1 may be turned on. Based on the second switching signal, during a period after the certain period, the switching voltage $P2G_B$ may be logic high, and accordingly, the third transistor P2B may be turned on. Based on the second switching signal, during the period after the certain period, the switching voltage $P2G_A$ may be logic high, and accordingly, the second transistor P2A may be turned on. The second path may be formed as a result of a switching operation of the third transistor P2B, and the third path may be formed as a result of a switching operation of the second transistor P2A.

In some embodiments, the gate controller and driver 122 may be configured to generate the third switching signal, and based on the third switching signal, the switching converter 110d may be configured to perform switching operations of the first transistor P1, the second transistor P2A, the third transistor P2B, the fourth transistor N2A, the fifth transistor N2B, the sixth transistor N1, and the seventh transistor Qbat to perform a boost converting operation. The gate controller and driver 122 may be configured to generate the fourth signal, and the switching converter 110d may be configured to perform the switching operations of the first transistor P1, the second transistor P2A, the third transistor P2B, the fourth transistor N2A, the fifth transistor N2B, the sixth transistor N1, and the seventh transistor Qbat based on the fourth switching signal to perform the buck converting operation or boost converting operation in the buck-boost mode.

Figure 6:
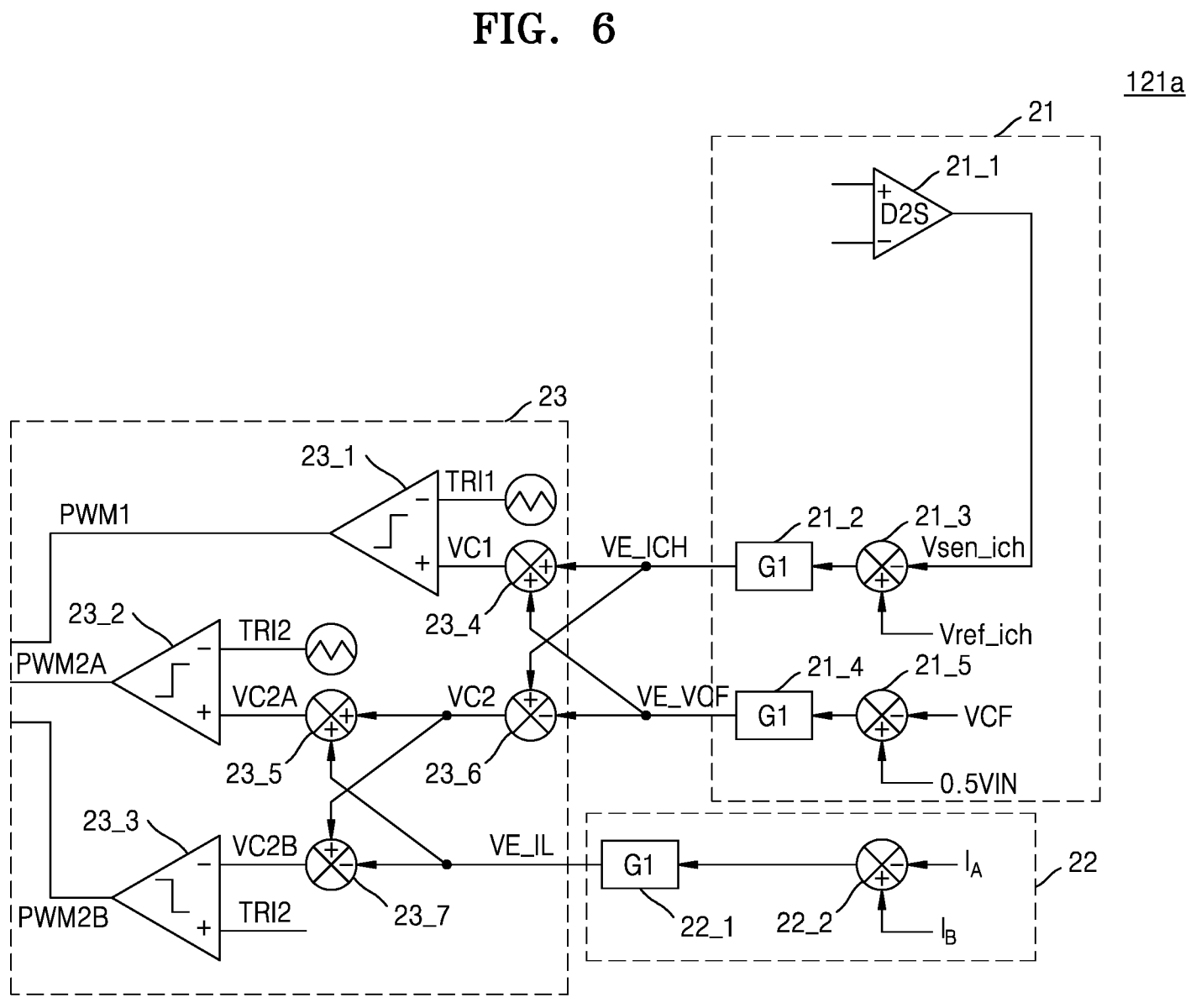

FIG. 6 is a diagram schematically illustrating a modulator 121a according to an embodiment of the inventive concept.

In some embodiments, the modulator 121*a* may include the modulator 121 shown in FIG. 5. For convenience of explanation, a further description of components and technical aspects previously described may be omitted.

The modulator 121*a* may include a first error detection circuit 21, a second error detection circuit 22, and a comparison circuit 23. The first error detection circuit 21 may include a comparator 21_1, a plurality of operators 21_3 and 21_5, and a plurality of controllers 21_2 and 21_4. In some embodiments, the comparator 21_1 may be connected to the battery 200*d* shown in FIG. 5 and configured to generate the voltage Vsen_ich. The operator 21_3 may be configured to receive the voltage Vsen_ich from the comparator 21_1 and output an error of the voltage Vsen_ich based on the voltage Vsen_ich and a reference voltage Vref_ich. The controller 21_2 may be configured to generate a first error voltage VE_ICH based on the error of the voltage Vsen_ich. The operator 21_5 may be configured to receive the voltage VCF from the switching converter 110*d* shown in FIG. 5 and output an error of the voltage VCF based on the voltage VCF and a voltage 0.5*VIN. The controller 21_4 may be configured to generate a second error voltage VE_VCF based on the error of the voltage VCF.

The second error detection circuit 22 may include an operator 22_2 and a controller 22_1. In some embodiments, the operator 22_2 may be configured to receive, from the switching converter 110*d* shown in FIG. 5, the plurality of currents $I_A$ and $I_B$ flowing through the first inductor $L_A$ and the second inductor $L_B$ shown in FIG. 5 and output errors of the currents based on the plurality of currents $I_A$ and $I_B$. The controller 22_1 may be configured to receive the errors of the currents from the operator 22_2 and generate a third error voltage VE_IL based on the errors of the currents.

The comparison circuit may include a first comparator 23_1, a second comparator 23_2, a third comparator 23_3, and a plurality of operators 23_4 to 23_7. The operator 23_4 may be configured to generate a first comparison voltage VC1 based on the first error voltage VE_ICH and the second error voltage VE_CF. The operator 23_6 may be configured to generate a second comparison voltage VC2 based on the first error voltage VE_ICH and the second error voltage VE_CF, and the operator 23_5 may be configured to generate a third comparison voltage VC2A based on the second comparison voltage VC2 and the third error voltage VE_IL. The operator 23_7 may be configured to generate a fourth comparison voltage VC2B based on the third error voltage VE_IL and the second comparison voltage VC2.

The first comparator 23_1 may be configured to generate the first PWM signal PWM1 by comparing a first ramp signal TRI1 with the first comparison voltage VC1. The second comparator 23_2 may be configured to generate the second PWM signal PWM2A by comparing a second ramp signal TRI2 with the third comparison voltage VC2A. The third comparator 23_3 may be configured to generate the third PWM signal PWM2B signal by comparing the second ramp signal TRI2 with the fourth comparison voltage VC2B. For example, the first comparator 23_1 may be configured to output the first PWM signal PWM1 of an inactive level when the first ramp signal TRI1 is less than the first comparison voltage VC1, and output the first PWM signal PWM1 signal of an active level when the first ramp signal TRI1 is equal to or greater than the first comparison voltage VC1. The second comparator 23_2 may be configured to output the second PWM signal PWM2A of an inactive level when the second ramp signal TRI2 is lower than the third comparison voltage VC2A, and output the second PWM signal PWM2A of an active level when the second ramp signal TRI2 is equal to or greater than the third comparison voltage VC2A. The third comparator 23_3 may be configured to output the third PWM signal PWM2B of an inactive level when the second ramp signal TRI2 is lower than the fourth comparison voltage VC2B, and output the third PWM signal PWM2B of an active level when the second ramp signal TRI2 is equal to or higher than the fourth comparison voltage VC2B.

In some embodiments, based on a loop (hereinafter referred to as a first loop) including the controller 21_2, the modulator 121*a* may be configured to control the switching converter 110*d* shown in FIG. 5 such that the voltage Vsen_ich and the reference voltage Vref_ich are equal to each other. Based on a loop (hereinafter referred to as a second loop) including the controller 21_4, the modulator 121*a* may be configured to control the switching converter 110*d* shown in FIG. 5 such that the voltage VCF and the voltage 0.5*VIN are equal to each other.

In some embodiments, based on a loop (hereinafter referred to as a third loop) including the controller 22_1, an average value of the current flowing through the first inductor $I_A$ and the second inductor $I_B$ shown in FIG. 5 may be constantly controlled. In this case, the modulator 121*a* may be configured to generate a plurality of PWM signals to satisfy [Equation 2], to thereby satisfy [Equation 1] to avoid having influences on the first loop and the second loop.

$$\frac{VC2A + VC2B}{2} = VC2 \qquad \text{[Equation 1]}$$

VC2 may indicate the second comparison voltage, VC2A may indicate the third comparison voltage, and VC2B may indicate the fourth comparison voltage.

$$VC2A = VC2 + VE\_IL \qquad \text{[Equation 2]}$$
$$VC2B = VC2 - VE\_IL$$

VC may indicate the second comparison voltage, VC2A may indicate the third comparison voltage, VC2B may indicate the fourth comparison voltage, and VE_IL may indicate the third error voltage. An embodiment in which the modulator 121*a* is configured to generate the plurality of PWM signals to satisfy [Equation 1] to avoid having influences on the first loop and the second loop will be described below with reference to FIG. 7.

Figure 7:
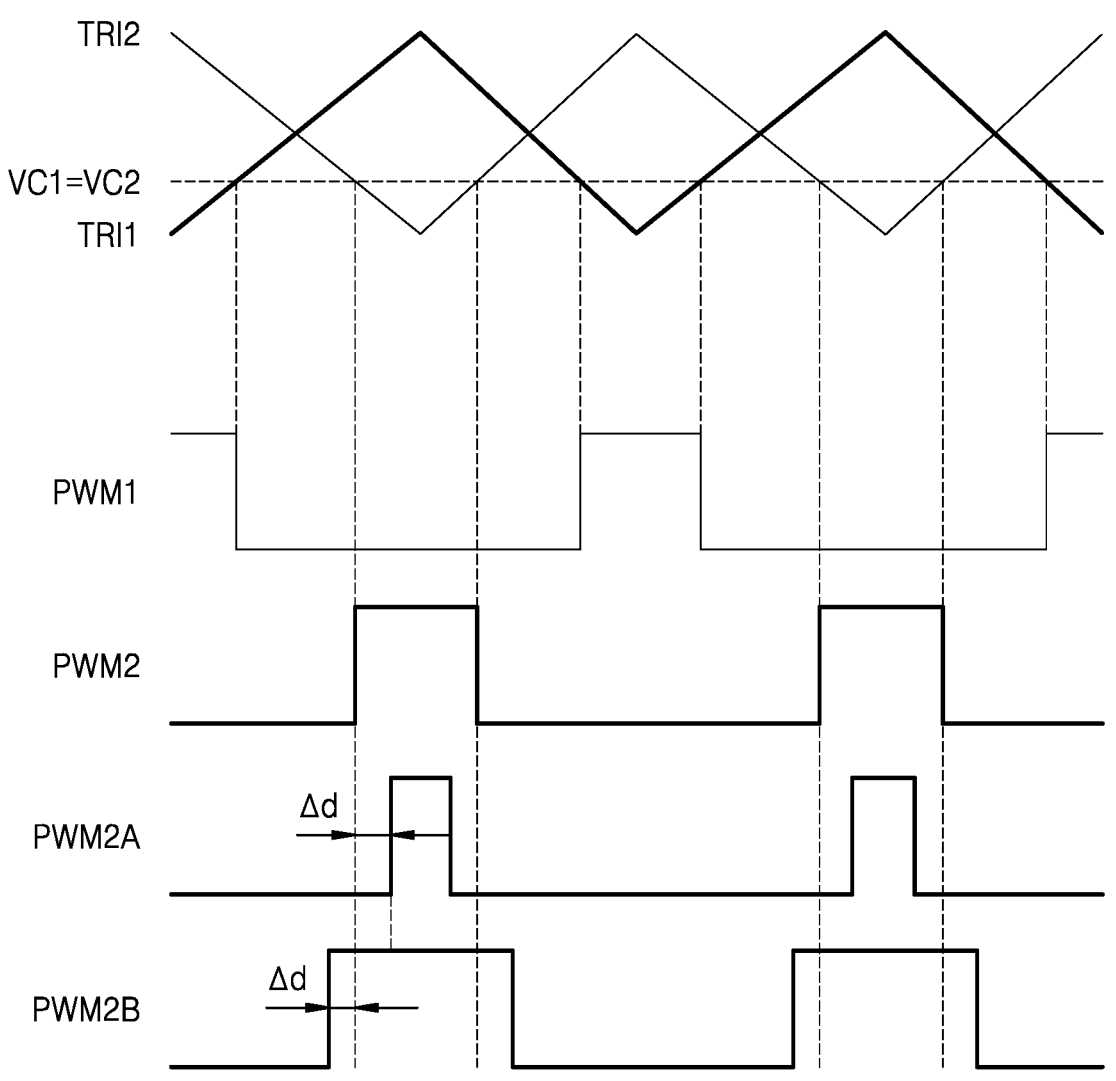
FIG. 7 is a timing chart of a controller configured to control a current flowing through a plurality of inductors according to an embodiment of the inventive concept.
Figure 8A:
FIGS. 8A and 8B are each a graph illustrating a current controlled by a controller according to an embodiment of the inventive concept.
Figure 8A:
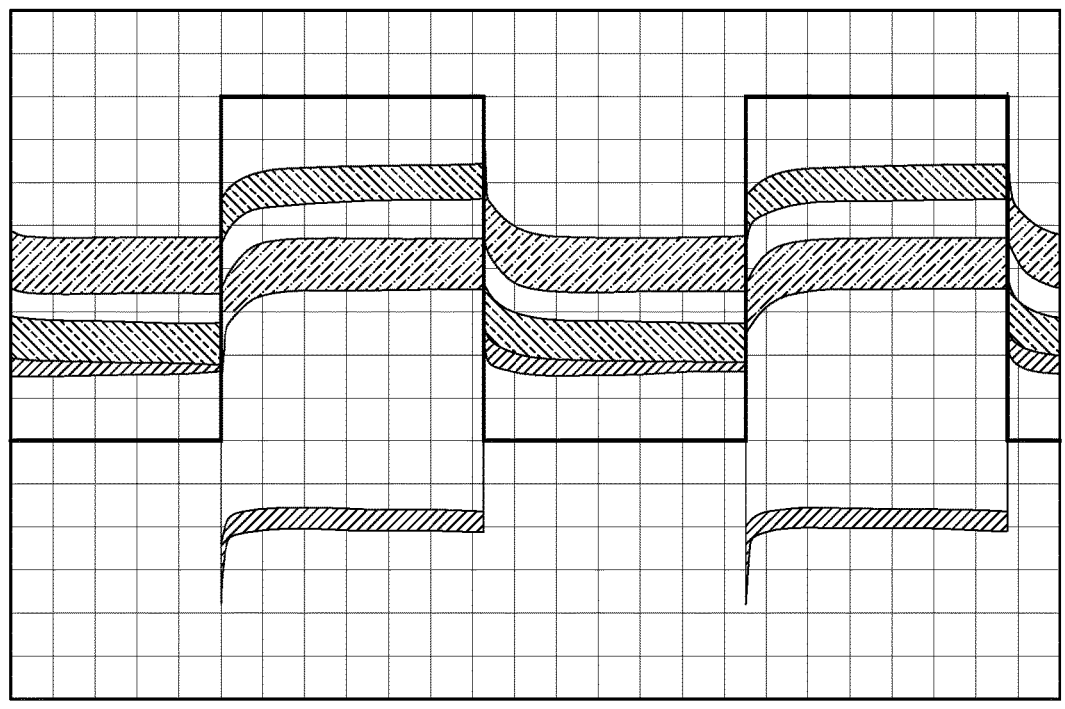
Figure 8B:
Figure 8B:
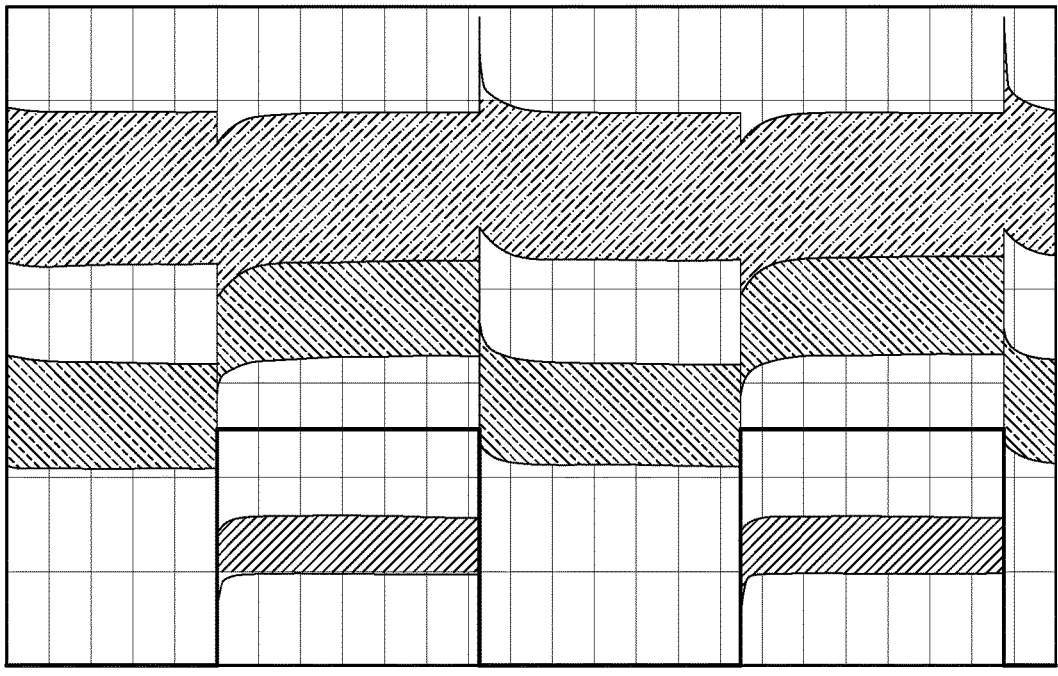

FIG. 7 is a timing chart of a controller 120 configured to control a current flowing through a plurality of inductors according to an embodiment of the inventive concept. FIGS. 8A and 8B are each a graph illustrating a current controlled by a controller according to an embodiment of the inventive concept.

Referring to FIGS. 3, 6 and 7, the timing chart shown in FIG. 7 may include a timing chart of the controller 120 shown in FIG. 1, which is configured to control a charge flowing through the plurality of inductors (e.g., the first inductor $L_A$ and the second inductor $L_B$) in the buck-operation described above with reference to FIG. 3.

The modulator 121*a* may be configured to generate the first PWM signal PWM1, the second PWM signal PWM2A, and the third PWM signal PWM2B to satisfy [Equation 1] described above. In some embodiments, the first comparison voltage VC1 and the second comparison voltage VC2 may be equal to each other. The first comparator 23_1 may be configured to output the first PWM signal PWM1 of the inactive level when the first ramp signal TRI1 is lower than the first comparison voltage VC1 and output the first PWM signal PWM1 of the active level when the first ramp signal TRI1 is equal to or higher than the first comparison voltage VC1. The second comparator 23_2 may be configured to output the second PWM signal PWM2A of an inactive level when the second ramp signal TRI2 is lower than the third comparison voltage VC2A and output the second PWM signal PWM2A of an active level when the second ramp signal TRI2 is equal to or higher than the third comparison voltage VC2A. The third comparator 23_3 may be configured to output the third PWM signal PWM2B of an inactive level when the second ramp signal TRI2 is lower than the fourth comparison voltage VC2B and output the third PWM signal PWM2B of an active level when the second ramp signal TRI2 is equal to or higher than the fourth comparison voltage VC2B.

In some embodiments, the modulator 121a may be configured to generate the second PWM signal PWM2A and the third PWM signal PWM2B as shown in [Equation 4], such that the fourth PWM signal PWM2 satisfies [Equation 3].

$$\text{Average}(PWM2A, PWM2B) = PWM2 \qquad \text{[Equation 3]}$$

$$I_A > I_B \rightarrow \Delta d > 0 \Rightarrow PWM2A < PWM2B \qquad \text{[Equation 4]}$$

$$I_A < I_B \rightarrow \Delta d < 0 \Rightarrow PWM2A > PWM2B$$

$\Delta d$ may indicate a difference between the fourth PWM signal PWM2 and the second PWM signal PWM2A or a difference between the fourth PWM signal PWM2 and the third PWM signal PWM2B, $I_A$ may indicate the current flowing through the first inductor $L_A$ shown in FIG. 5, and $I_B$ may indicate the current flowing the second inductor $L_B$ shown in FIG. 5. For example, when $I_A$ is greater than $I_B$, $\Delta d$ may include a positive number, and the modulator 121a may be configured to generate the second PWM signal PWM2A and the third PWM signal PWM2B such that a time period during which the second PWM signal PWM2A is at the active level is longer than a time period during which the third PWM signal PWM2B is at the active level. When $I_A$ is less than $I_B$, $\Delta d$ may include a negative number, and the modulator 121a may be configured to generate the second PWM signal PWM2A and the third PWM signal PWM2B such that a time period during which the second PWM signal PWM2A is at the active level is shorter than a time period during which the third PWM signal PWM2B is at the active level. Accordingly, $I_A$ may be controlled to be identical to $I_B$.

Further referring to FIGS. 5, 8A, and 8B, the graph shown in FIG. 8A may include a graph illustrating a case in which a charging current ICH for charging the battery 200d is less than the load current IL during a buck-converting operation of the switching converter 110d. The graph shown in FIG. 8B may include a graph illustrating a case in which the charging current ICH for charging the battery 200d is greater than the load current IL during the buck-converting operation of the switching converter. The charging current ICH may include a sum of a first charging current $I_{CH\_indirect}$ and a second charging current $I_{CH\_direct}$, where the first charging current $I_{CH\_indirect}$ is the current flowing through the first inductor $L_A$ and the second charging current $I_{CH\_direct}$ is the current flowing through the second inductor $L_B$. In some embodiments, both in the graphs shown in FIGS. 8A and 8B, the current may be controlled as shown in [Equation 5], and the first charging current $I_{CH\_indirect}$ and the second charging current $I_{CH\_direct}$ may satisfy [Equation 6].

$$I_A + I_B = I_{CH} + I_L \qquad \text{[Equation 5]}$$

$$I_{CH\_Direct} = (I_{CH} + I_L)/2 \qquad \text{[Equation 6]}$$

$$I_{CH\_Indirect} = (I_{CH} + I_L)/2 - I_L = (I_{CH} - I_L)/2$$

Accordingly, in the graph shown in FIG. 8A, the current flowing through the seventh transistor Qbat may have a negative value, and when IL<3·ICH is satisfied, a current loss in the seventh transistor Qbat may be further reduced than when the switching converter 110d includes one inductor. In the graph shown in FIG. 8B, when the switching converter 110d includes one inductor, a value of the current flowing through the seventh transistor Qbat is $I_{CH}$. On the other hand, when the switching converter 110d includes two or more inductors, the value of the current flowing through the seventh transistor Qbat is $(I_{CH} - I_L)/2$ and the current flowing through the seventh transistor Qbat may be reduced, and thus, the current loss in the seventh transistor Qbat may be reduced.

Figure 9:
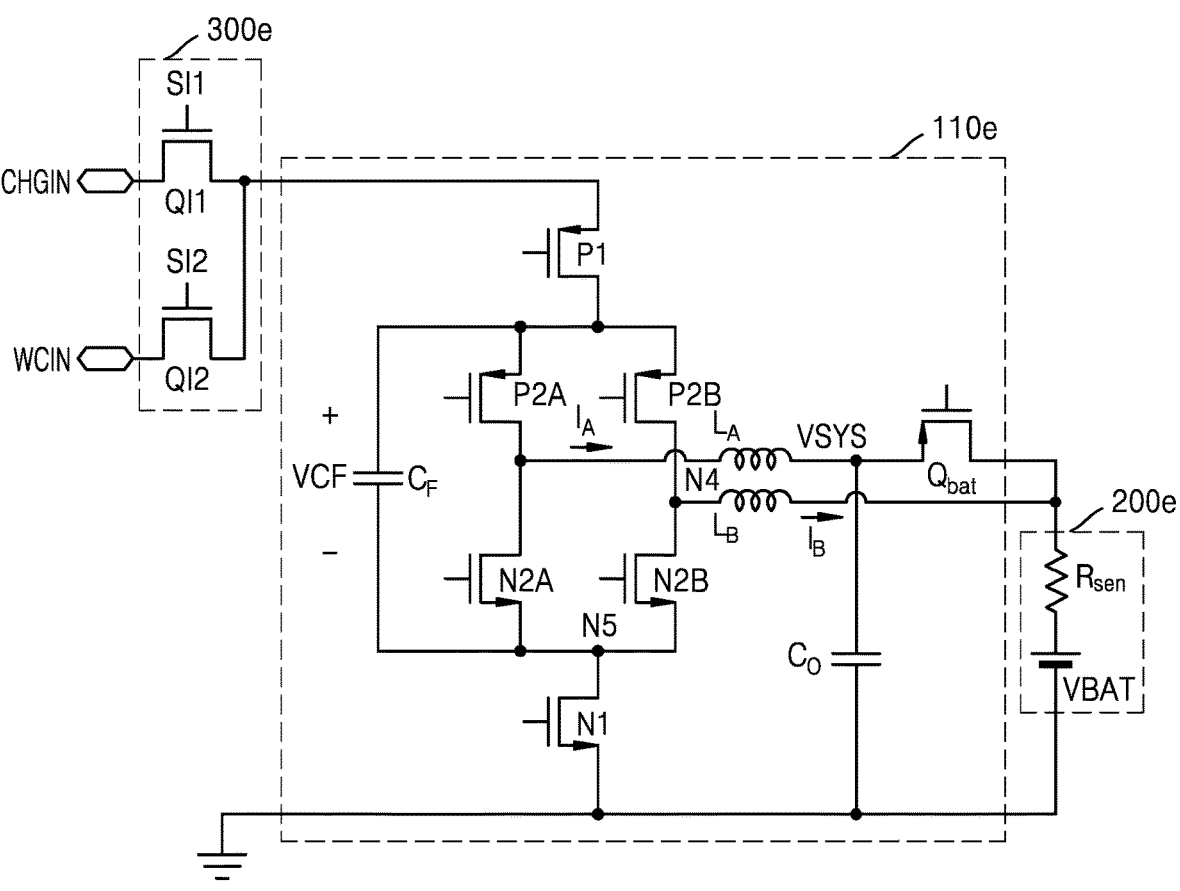
FIG. 9 is a circuit diagram illustrating an example of a configuration of a switching converter according to an embodiment of the inventive concept.

FIG. 9 is a circuit diagram illustrating an example of a configuration of a switching converter 110e according to an embodiment of the inventive concept. In some embodiments, the switching converter 110e may include the switching converter 110 shown in FIG. 1 or the switching converter 110a shown in FIG. 2, and a battery 200e may include the battery 200 shown in FIG. 1. A power interface 300e may include the power interface 300 shown in FIG. 1. For convenience of explanation, a further description of components and technical aspects previously described may be omitted.

Referring to FIG. 9, the power interface 300e may include a wired charging circuit QI1 controlled by a signal SI1 and a wireless charging circuit QI2 controlled by a signal SI2. In some embodiments, a travel adapter (TA) or an auxiliary battery may be electrically connected to the power interface 300e through the wired charging circuit QI1. TA may be configured to convert the power, which is provided from AC 110 to 220 V as a domestic power source or another power supply unit (e.g., a computer), into a DC power for charging the battery 200e, and provide the power to the electronic device (e.g. the electronic device 10 shown in FIG. 1). In the buck mode or the buck-boost mode, the charger integrated circuit 100e may be configured to charge the battery 200e using the first input voltage CHGIN received from the TA or the auxiliary battery or provide the power to the power interface 300e.

In some embodiments, an On The Go (OTG) device (e.g., an OTG USB device) may be connected to the wired charging circuit QI1, and the switching converter 110e may be configured to provide power to the OTG device through the power interface 300e. In this case, the charger integrated circuit 100e may be configured to provide the power to the OTG device based on the voltage of the battery 200e, in the boost mode, or may be configured to charge the battery 200e based on the second input voltage WCIN from the power interface 300e while providing the power to the OTG device in the buck mode.

In some embodiments, as the electronic device (e.g., the electronic device 10 shown in FIG. 1) supports wired and wireless charging, the charger integrated circuit 100 may be configured to operate in a plurality of switching mode including the buck mode, the boost mode, and the buck-boost mode to support wired charging and/or wireless charging, wired charging-wireless power supply, and wireless charging-wired power supply. For example, during the buck converting operation, the switching converter 1103 may receive a first input voltage CHGIN through the wired charging circuit QI1 and receive a second input voltage WCIN through the wireless charging circuit Q12. The switching converter 110e may be configured to charge the battery 200e based on the first input voltage CHGIN and/or the second input voltage WCIN. In the boost converting operation, the switching converter 110e may be configured to provide power through the wired charging circuit QI1 and/or the wireless charging circuit Q12 based on a voltage of the battery 200e.

Figure 10:
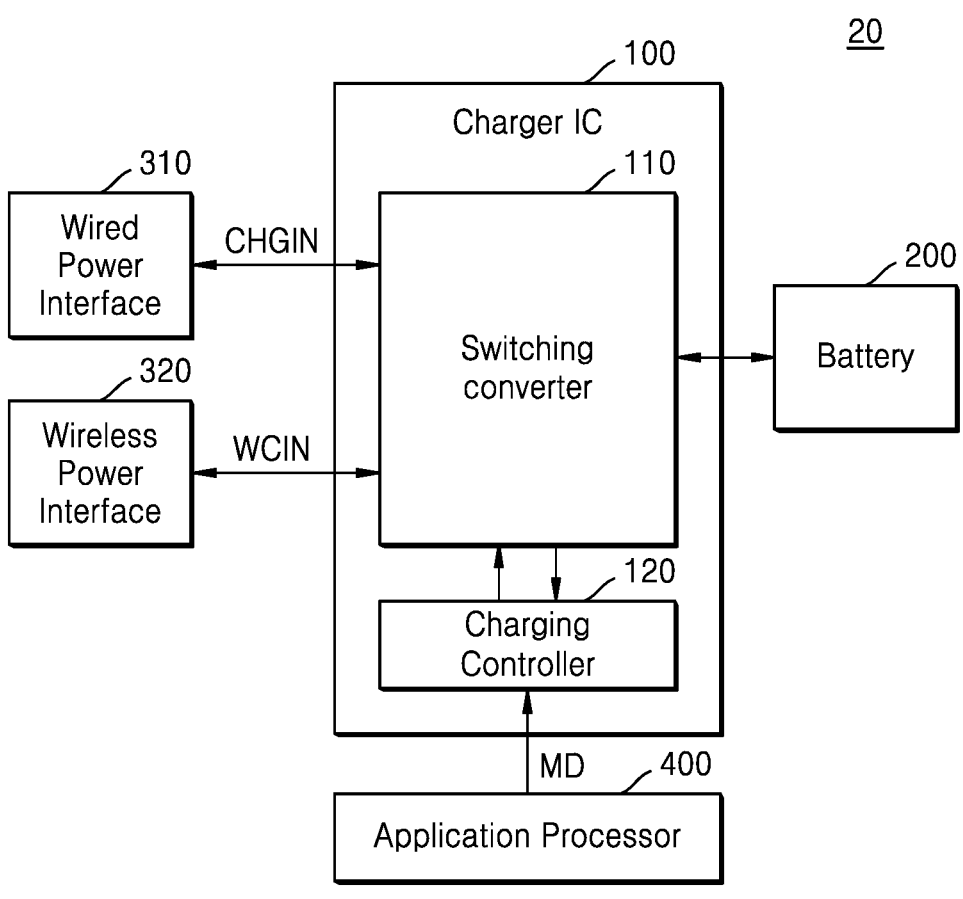
FIG. 10 is a block diagram schematically illustrating an electronic device including a charger integrated circuit according to an embodiment of the inventive concept.

FIG. 10 is a block diagram schematically illustrating an electronic device 20 including the charger integrated circuit 100 according to an embodiment of the inventive concept.

Referring to FIG. 10, the electronic device 20 may include the charger integrated circuit 100, the battery 200, a wired power interface 310, a wireless power interface 320, and an application processor 400. As operations of the charger integrated circuit 100, the battery 200, the wired power interface 300, and the wireless power interface 320 have been described above with reference to FIG. 1, same descriptions thereof will not be given for convenience of explanation.

In the electronic device 20 shown in FIG. 10, the application processor 400 may be configured to recognize voltages provided from devices connected to the wired power interface 310 and the wireless power interface 320 or from the wired power interface 310 and the wireless power interface 320, e.g., the first input voltage CHGIN and the second input voltage WCIN. The application processor 400 may be configured to generate a mode signal MD that determines a switching mode according to an interface or input voltage that has been recognized, and provide the mode signal MD to the controller 120 of the charger integrated circuit 100.

For example, when the first input voltage CHGIN is applied through the wired power interface 310 and a wireless power transmission circuit is connected to the wireless power interface 320, the application processor 400 may recognize the first input voltage CHGIN and the wireless power transmission circuit and generate the mode signal MD indicating a buck-boost mode. When an OTG device is connected to the wired power interface 310 or the wireless power transmission circuit is connected to the wireless power interface 320, the application processor 400 may generate the mode signal MD indicating a boost mode.

For example, when the voltage of the battery 200 is lower than the threshold voltage, the application processor 400 may generate the mode signal MD indicating the load boosting mode, and the controller 120 may control the switching converter 110 to perform a switching operation (e.g., a load boosting operation) corresponding to the mode signal MD.

Figure 11:
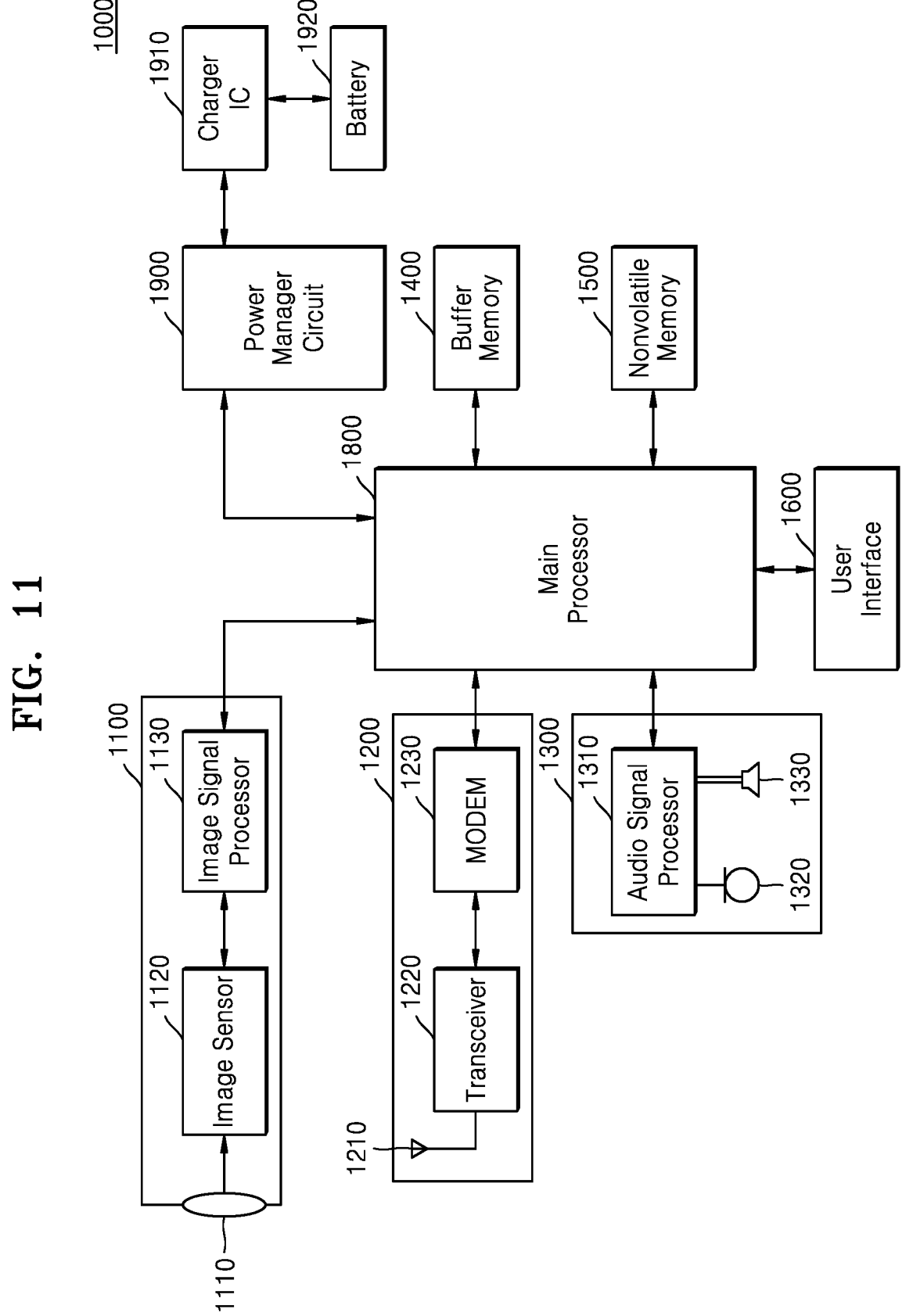
FIG. 11 is a block diagram of an example of a configuration of an electronic device including a charger integrated circuit according to an embodiment of the inventive concept.

FIG. 11 is a block diagram of an example of a configuration of an electronic device 1000 including a charger integrated circuit according to an embodiment of the inventive concept.

Referring to FIG. 11, the electronic device 1000 may include various electronic circuits. For example, the electronic circuits in the electronic device 1000 may include an image processing block 1100, a communication block 1200, an audio processing block 1300, a buffer memory 1400, a nonvolatile memory 1500, a user interface 1600, a main processor 1800, a power manager circuit 1900, and a charger integrated circuit 1910.

The electronic device 1000 may be connected to a battery 1920, and the battery 1920 may be configured to provide power used for operations of the electronic device 1000. However, embodiments are not limited thereto, and the power provided to the electronic device 1000 may be provided from other internal/external power sources in addition to the battery 1920 according to embodiments.

The image processing block 1100 may be configured to receive light through a lens 1110. An image sensor 1120 and an image signal processor 1130, which are included in the image processing block 1100, may be configured to generate image information related to external objects, based on the light that is received.

The communication block 1200 may exchange signals with an external device/system through an antenna 1210. A transceiver 1220 and a modem (modulator/demodulator) 1230 of the communication block 1200 may be configured to process the signals exchanged with the external device/system, according to one or more of various wired/wireless communication protocols.

The audio processing block 1300 may be configured to process acoustic information using an audio signal processor 1310. The audio processing block 1300 may be configured to receive an audio input through a microphone 1320 and output audio sound through a speaker 1330.

The buffer memory 1400 may be configured to store data used for the operation of the electronic device 1000. For example, the buffer memory 1400 may be configured to temporarily store data that has been processed or is to be processed by the main processor 1800. For example, the buffer memory 1400 may include a volatile memory device such as static random access memory (SRAM), dynamic RAM (DRAM), and synchronous DRAM (SDRAM) and a nonvolatile memory device such as phase-change RAM (PRAM), magneto-resistive RAM (MRAM), resistive RAM (ReRAM), and ferroelectric RAM (FRAM).

The nonvolatile memory 1500 may be configured to store data regardless of whether power is provided. For example, the nonvolatile memory 1500 may include at least one of various nonvolatile memory devices such as flash memory, PRAM, MRAM, ReRAM, and FRAM. For example, the nonvolatile memory 1500 may include a non-embedded memory device such as a secure digital (SD) card or solid state drive (SSD) and/or an embedded memory device such as an Embedded Multimedia Card (eMMC).

The user interface 1600 may be configured to arbitrate communication between a user and the electronic device 1000. For example, the user interface 1600 may include an input interface configured to receive inputs from the user and an output interface configured to provide information to the user.

The main processor 1800 may be configured to control general operations of components in the electronic device 1000. The main processor 1800 may be configured to process various operations to operate the electronic device 1000. For example, the main processor 1800 may be implemented as a general-purpose processor, a special-purpose processor, an application processor, a microprocessor, and the like, and may include one or more processor cores.

The power manager circuit 1900 may be configured to provide the power to the components in the electronic device 1000 and manage the power. For example, the power manager circuit 1900 may be configured to output a system voltage, based on the power provided from the charger integrated circuit 1910 and/or the battery 1920. The power manager circuit 1900 may be configured to adjust, for example, a frequency of each of the components, a voltage level of the system voltage provided, according to temperatures of the components, operations modes (e.g., a performance mode, a standby mode, a slip mode) and the like.

The charger integrated circuit 1910 may be configured to charge the battery based on the power provided from external power or provide the power to the power manager circuit 1900. Alternatively, the charger integrated circuit 1910 may be configured to provide power to the external device through a wired or wireless power interface based on the power provided from the battery 1920.

The charger integrated circuit 100 described with reference to FIGS. 1 to 10 may be applied to the electronic device 1000 as the charger integrated circuit 1910. The charger integrated circuit 100 may include a bi-directional switching converter implemented as a 3-level DC-DC converter. The bi-directional switching converter may be configured to operate in the buck mode, the buck-boost mode, the boost mode, and the load boosting mode. The bi-directional switching converter may include two or more inductors and one capacitor.

In the buck mode, the charger integrated circuit 100 may increase an amount of power for charging the battery 1920 due to the currents flowing through two or more inductors, and a current flowing through one inductor passes through a charger transistor (e.g., the charger transistor Qbat shown in FIG. 3) while a current flowing through another inductor does not pass through the charger transistor. As a result, power loss due to the resistance component may be reduced.

In the load-boosting mode, the charger integrated circuit 100 includes two or more inductors, and therefore, through the load-boosting operation, may be configured to maintain the electronic device 1000 to not be turned off even when the voltage of the battery 1920 is lower than the threshold voltage.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the inventive concept has been particularly shown and described with reference to embodiments thereof, it will be understood that various changes in form and detail may be made therein without departing from the spirit and scope of the inventive concept as defined by the following claims.

What is claimed is:

1. A charger integrated circuit, comprising a switching converter and a controller, the switching converter comprising:

a plurality of transistors comprising a first transistor, a second transistor, a fourth transistor, and a sixth transistor, which are connected in series to a first input/output node, and a third transistor and a fifth transistor, which are connected in series between a first connection node and a second connection node;

a plurality of inductors comprising a first inductor connected between a third connection node and a load node, and a second inductor connected between a fourth connection node and a second input/output node;

a capacitor connected between the first connection node and the second connection node; and the controller configured to generate a plurality of pulse width modulation (PWM) signals based on a plurality of signals received from the switching converter, and generate, based on the plurality of PWM signals, a plurality of switching signals that control switching operations of the plurality of transistors, wherein the first transistor is connected between the first input/output node and the first connection node, the second transistor is connected between the first connection node and the third connection node, the third transistor is connected between the first connection node and the fourth connection node, the fourth transistor is connected between the third connection node and the second connection node, the fifth transistor is connected between the fourth connection node and the second connection node, and the sixth transistor is connected between the second connection node and the second input/output node.

2. The charger integrated circuit of claim 1, wherein the controller is further configured to, while the switching converter generates an output voltage of the second input/output node by performing a first operation of bucking an input voltage of the first input/output node, control an average value of a current flowing through the first inductor to be equal to an average value of a current flowing through the second inductor.

3. The charger integrated circuit of claim 1, wherein the plurality of transistors further comprises a seventh transistor connected between the load node and the second input/output node.

4. The charger integrated circuit of claim 3, wherein the switching converter is configured to generate a voltage of the load node to be a voltage higher than a voltage of the second input/output node by performing a second operation when the voltage of the second input/output node is less than a threshold voltage.

5. The charger integrated circuit of claim 4, wherein the second operation comprises:

a third operation in which the controller is further configured to turn off the first transistor and the seventh transistor and turn on the sixth transistor, based on a voltage applied to a gate of the first transistor, a gate of the sixth transistor, and a gate of the seventh transistor;

a fourth operation in which the controller, after the third operation, is further configured to perform boost-switching on the third transistor and the fifth transistor based on a voltage applied to a gate of the third transistor and a gate of the fifth transistor; and a fifth operation in which the controller, after the third operation, is further configured to perform buck-switching on the second transistor and the fourth transistor based on a voltage applied to a gate of the second transistor and a gate of the fourth transistor.

6. The charger integrated circuit of claim 1, wherein the load node and the second input/output node is a same node.

7. The charger integrated circuit of claim 1,
wherein the controller is further configured to receive, from the switching converter, a first current flowing through the first inductor and a second current flowing through the second inductor, and control an average value of the first current to be equal to an average value of the second current.

8. The charger integrated circuit of claim 7, wherein the controller comprises a compensator configured to generate an error voltage based on the first current and the second current.

9. The charger integrated circuit of claim 1, wherein the controller is further configured to
control the switching operations in a first mode such that the switching converter provides first power from the first input/output node to the second input/output node,
control the switching operations in a second mode such that the switching converter provides second power from the second input/output node to the first input/output node,
control the switching operations in a third mode such that the switching converter provides the first power to the second input/output node or provides the second power to the first input/output node, and
control the switching operations in a fourth mode such that the switching converter provides third power to the first connection node and provides fourth power to the load node.

10. A charger integrated circuit comprising:
a first transistor connected between a first node and a second node;
a second transistor connected between the second node and a third node;
a third transistor connected between the second node and a fourth node;
a fourth transistor connected between the third node and a fifth node;
a fifth transistor connected between the fourth node and the fifth node;
a sixth transistor connected between the fifth node and a sixth node;
a first inductor connected between the third node and a seventh node;
a second inductor connected between the fourth node and an eighth node; and
a capacitor connected between the second node and the fifth node, wherein
the charger integrated circuit is configured to generate a voltage of the eighth node as an output voltage by bucking a voltage of the first node.

11. The charger integrated circuit of claim 10, further comprising:
a seventh transistor connected between the seventh node and the eighth node.

12. The charger integrated circuit of claim 10, wherein an average value of a first current flowing through the first inductor is equal to an average value of a second current flowing through the second inductor.

13. The charger integrated circuit of claim 11,
wherein, when the voltage of the eighth node is less than a threshold voltage, a second operation and a third operation are performed after a first operation is performed,
wherein, in the first operation, the first transistor and the seventh transistor are turned off and the sixth transistor is turned on, in the second operation, boost-switching is performed on the third transistor and the fifth transistor, and
in the third operation, buck-switching is performed on the second transistor and the fourth transistor.

14. The charger integrated circuit of claim 10, wherein the seventh node and the eighth node is a same node.

15. The charger integrated circuit of claim 10, wherein a sum of a magnitude of a first current flowing through the first inductor and a magnitude of a second current flowing through the second inductor is equal to a sum of a magnitude of a current flowing through a load connected to the seventh node and a magnitude of a current flowing through a battery connected to the eighth node.

16. An electronic device to/from which a battery is attached/detached, the electronic device comprising:
a charger integrated circuit comprising a plurality of transistors comprising first to sixth transistors, a first inductor, a second inductor, and a capacitor,
wherein the first transistor is connected between a first node and a second node, the second transistor is connected between the second node and a third node, the third transistor is connected between the second node and a fourth node, the fourth transistor is connected between the third node and a fifth node, the fifth transistor is connected between the fourth node and the fifth node, the sixth transistor is connected between the fifth node and a sixth node, the first inductor is connected between the third node and a seventh node, the second inductor is connected between the fourth node and an eighth node, and the capacitor is connected between the second node and the fifth node,
wherein the charger integrated circuit is configured to charge the battery by forming a first path comprising a first subpath and a second subpath,
wherein the first subpath provides power from the first node to the battery through the first inductor, and the second subpath provides the power from the first node to the battery through the second inductor.

17. The electronic device of claim 16, wherein the plurality of transistors further comprises a charger transistor connected between the first inductor and the second inductor.

18. The electronic device of claim 17,
wherein, when a voltage of an input/output node is less than a threshold voltage, the charger integrated circuit is configured to turn off the first transistor and the charger transistor, form a second path configured to provide power from the battery to the first node through the second inductor, and form a third path configured to provide power from the first node to the seventh node between the charger transistor and the first inductor through the first inductor.

19. The electronic device of claim 16, further comprising:
a controller configured to generate a switching signal that controls an average value of a current flowing through the first inductor to be equal to an average value of a current flowing through the second inductor.

20. The electronic device of claim 16, further comprising:
a wireless power interface and a wired power interface,
wherein the charger integrated circuit is configured to charge the battery based on power provided through the wireless power interface or the wired power interface, or provide the power provided from the battery to the wireless power interface or the wired power interface.

* * * * *